Jan. 6, 1948. J. IMBER 2,434,162
BOMBS, PYROTECHNIC DEVICES, AND THE LIKE
Filed Dec. 4, 1944 6 Sheets-Sheet 1

Jan. 6, 1948. J. IMBER 2,434,162
BOMBS, PYROTECHNIC DEVICES, AND THE LIKE
Filed Dec. 4, 1944 6 Sheets-Sheet 3

Inventor
Jack Imber
By
Attorneys

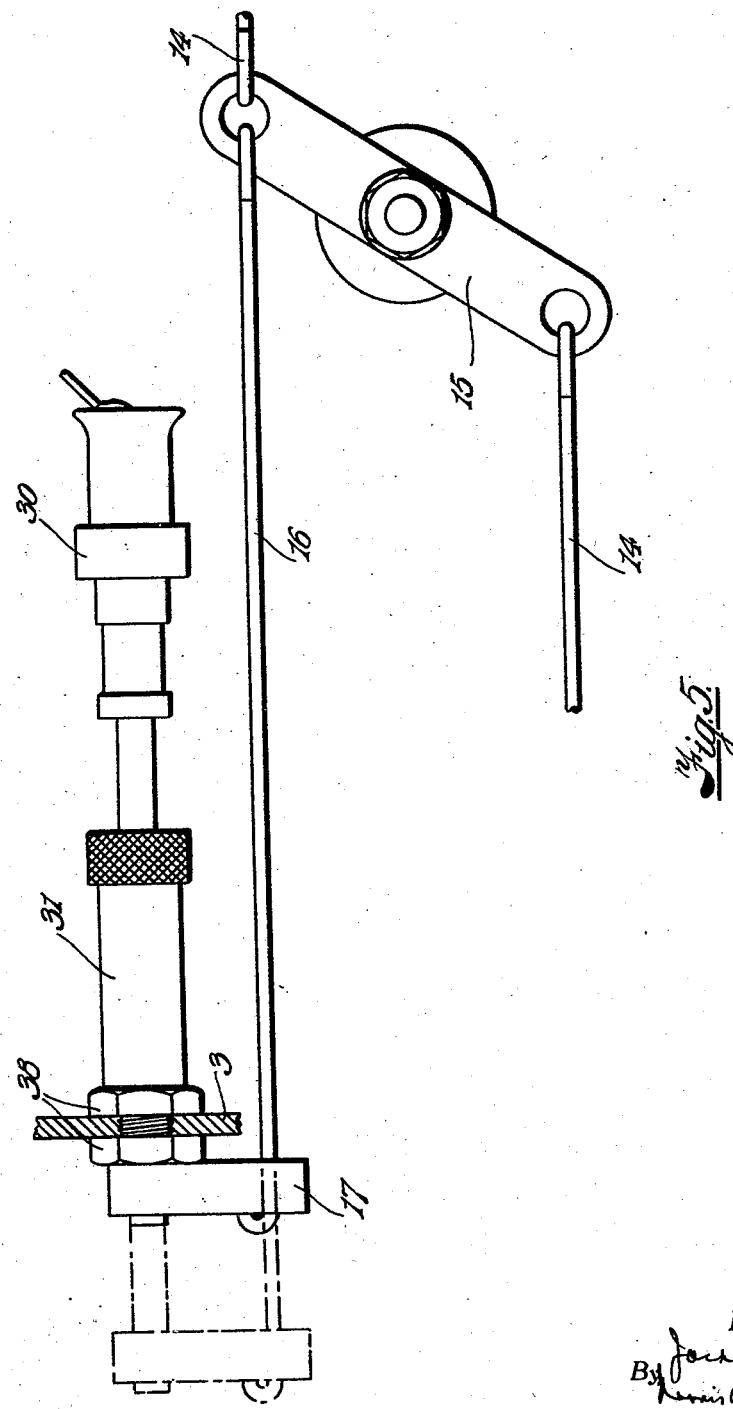

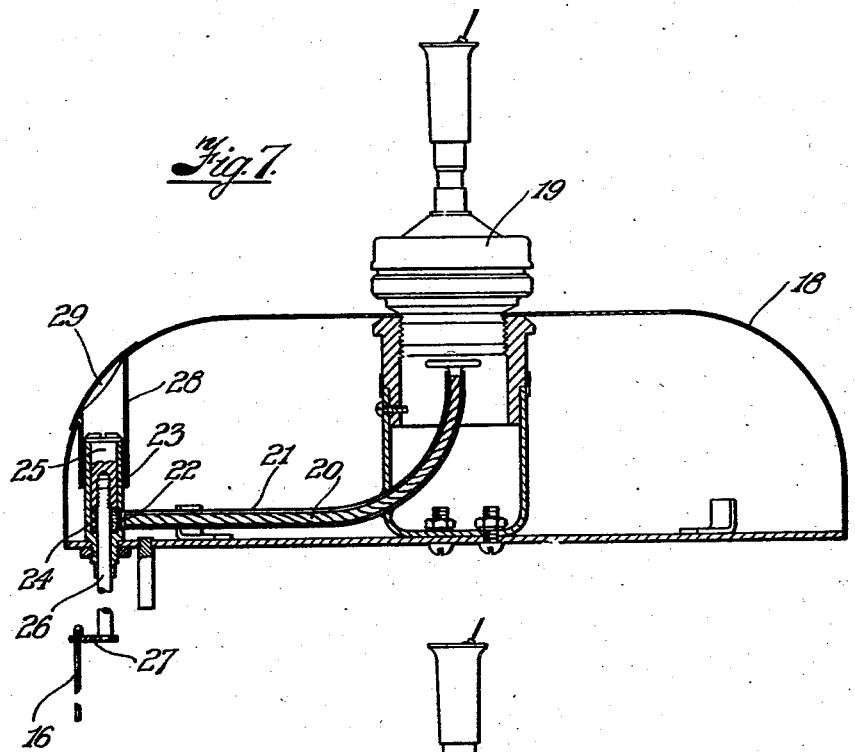
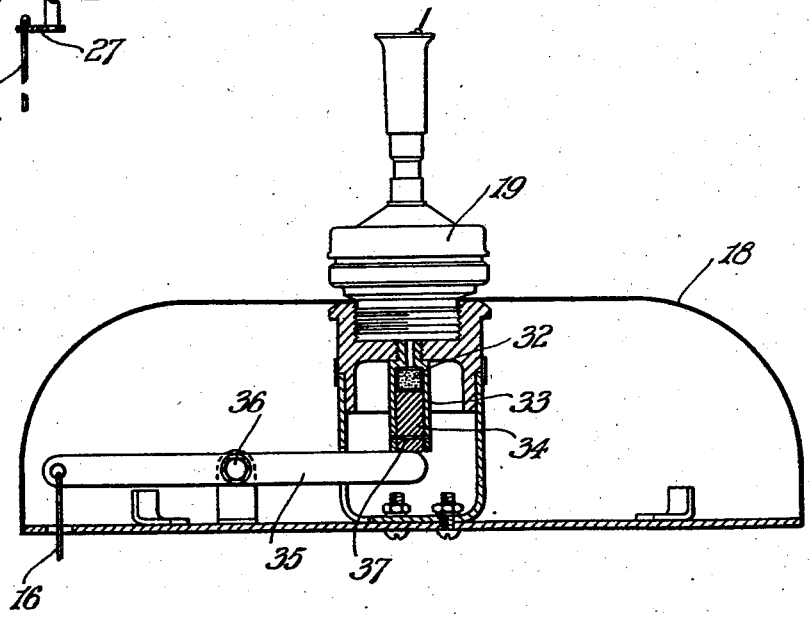

Patented Jan. 6, 1948

2,434,162

UNITED STATES PATENT OFFICE 2,434,162

BOMBS, PYROTECHNIC DEVICES, AND THE LIKE

Jack Imber, Farnham Common, England

Application December 4, 1944, Serial No. 566,460
In Great Britain September 9, 1942

6 Claims. (Cl. 102—7.2)

This invention relates to bombs, flares and the like of the kind used for dropping from aircraft and which are frequently dropped as clusters, the components of which are dispersed after leaving the aircraft.

Hitherto it has been the practice to cause dispersal of the components of a bomb or flare cluster by mechanical means attached to the cluster and connected to the bomb carrier of the aircraft by means of a wire, cord or the like so that when the cluster is released the pull on the wire or cord operates the release mechanism and the cluster breaks up immediately underneath the aircraft. This arrangement, however, is subject to the disadvantage that neither the cluster nor the components of it can be accurately aimed at a target.

The object of the present invention is to provide improved means for assembling and dispersing a cluster of bombs, flares or the like designed to enable the cluster to be aimed at a target and dispersed at a predetermined height above ground.

According to the invention means for releasing an assemblage of bombs, flares or the like adapted to be discharged from an aircraft as a cluster are characterized by a fuze mechanism arranged to operate or initiate the operation of release mechanism to permit the components of the cluster to fall apart after a predetermined time interval.

According to the preferred form of the invention means for releasing the members of an assemblage of bombs, flares or the like after discharge as a cluster from an aircraft comprise retaining means adapted to surround said assemblage, interengaging locking devices forming parts of said retaining means and time fuze mechanism the operation of which is initiated during release of the assemblage from the aircraft to actuate mechanical means for releasing said locking devices and allow the components of the assemblage to disperse after falling a predetermined distance.

Figure 1:
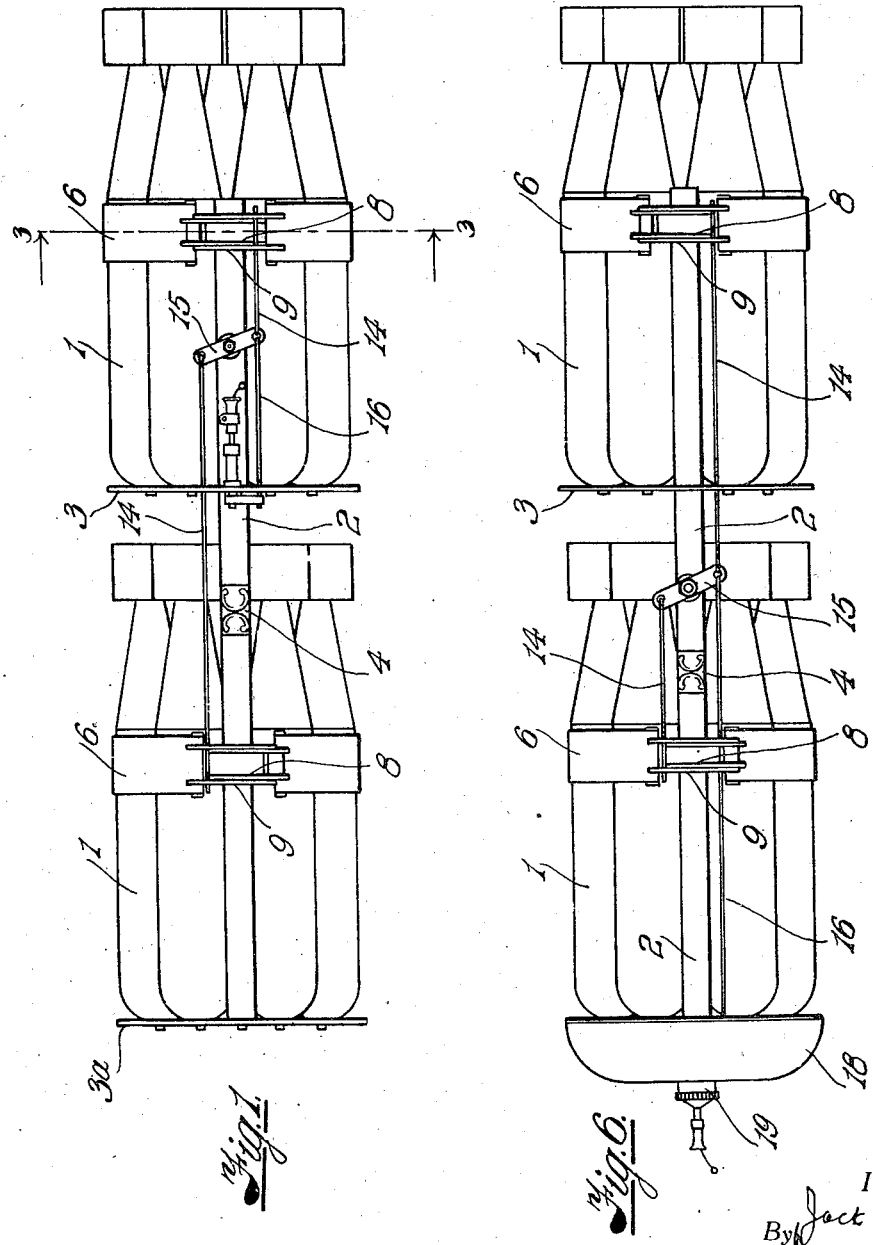
Figure 2:
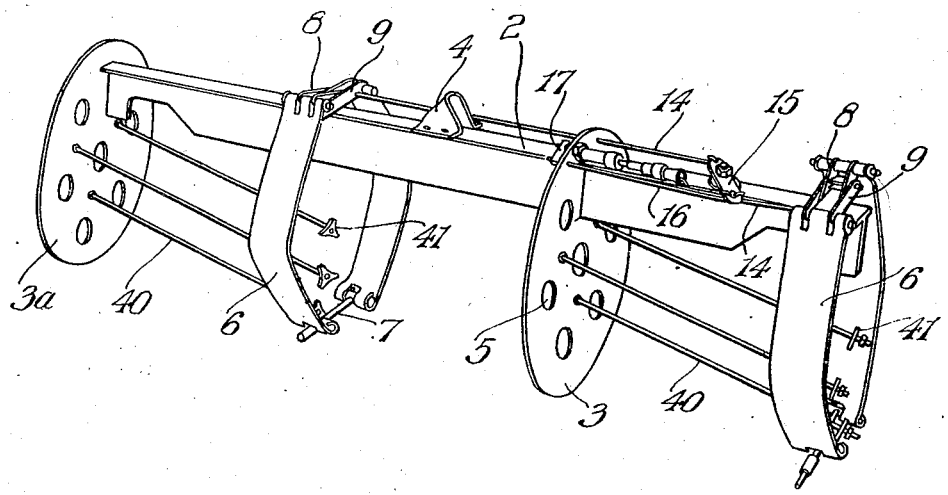
Figure 3:
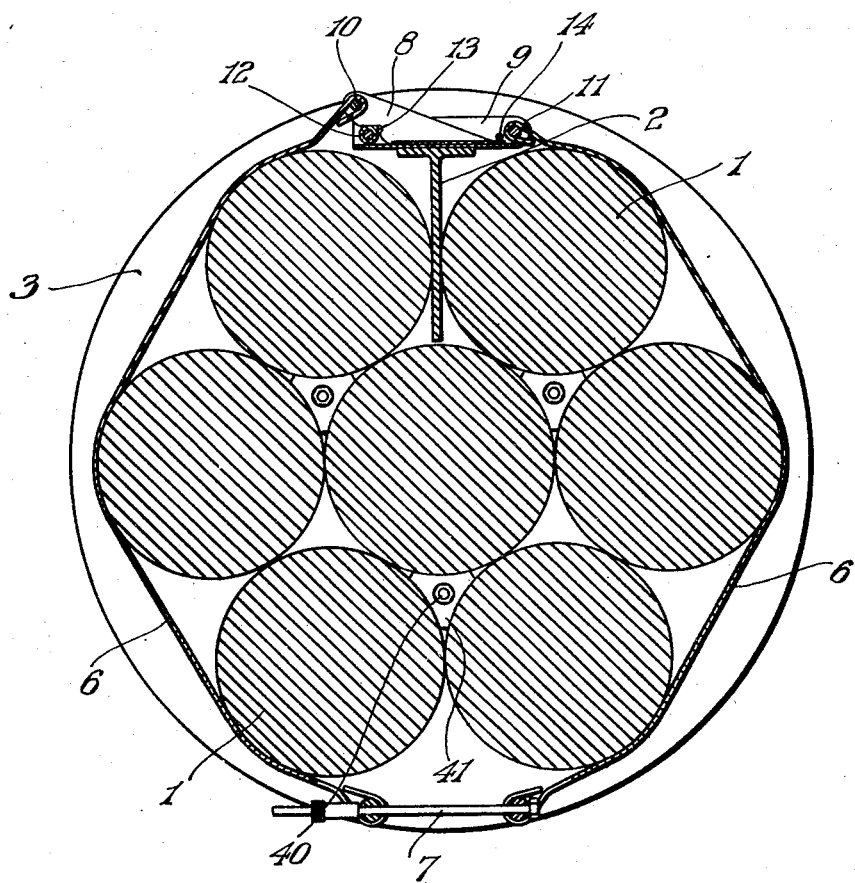
Figure 4:
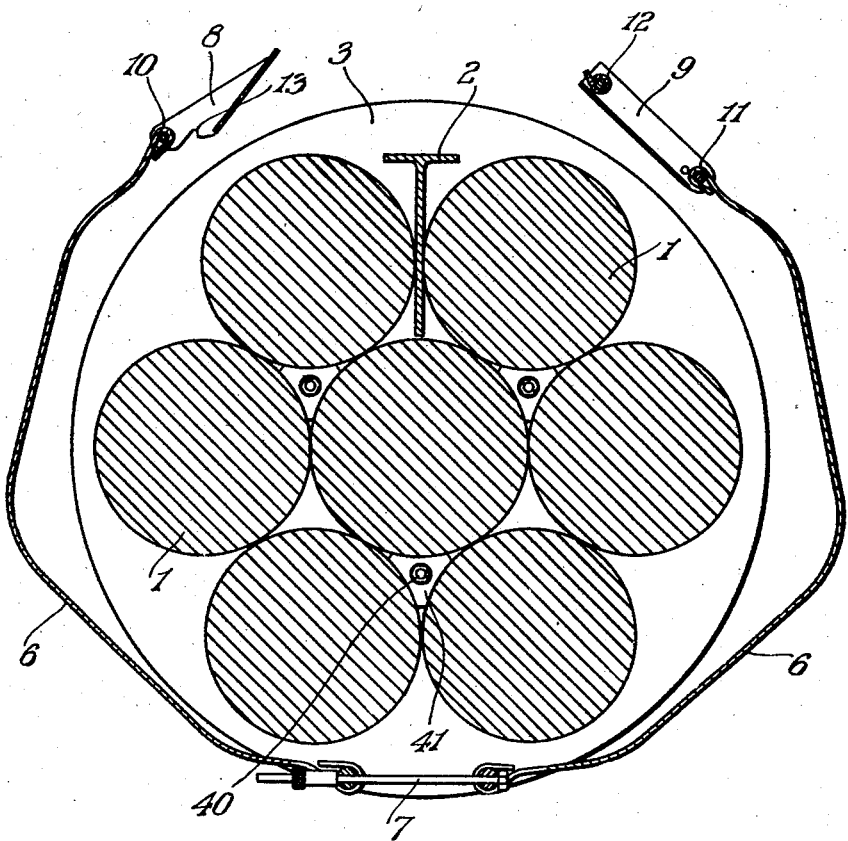

Reference will now be made to the accompanying drawings which illustrate constructions according to the invention and in which:

Fig. 1 is a plan view of an assembly of bombs ready for release,

Fig. 2 is a perspective view of the locking mechanism shown in Fig. 1 but without the bomb assembly, Fig. 3 is a transverse section of the assembly on the line 3—3 in Fig. 1 with the locking mechanism in position, Fig. 4 is a transverse section on the same line as Fig. 3 but showing the locking mechanism detached, Fig. 5 is a plan showing means for releasing the locking mechanism, Fig. 6 is a plan view of an assembly of bombs but including an alternative form of release mechanism, Fig. 7 is a sectional elevation showing in detail the release mechanism shown in Fig. 6 and Fig. 8 is a sectional elevation showing a modification of the mechanism shown in Fig. 7.

Referring first to Figs. 1 and 2 of the drawings, two assemblages of bombs indicated at 1 are adapted to be mounted in a retaining device which is separately shown in Fig. 2 and consists of a longitudinal frame member 2 of T-section, carrying near its mid-portion and at one end perforated discs 3, and 3a. The frame member 2 is provided with means 4 for attachment to the bomb rack of an aircraft. The noses of the bombs are adapted to seat in the perforations 5 in the discs 3 and 3a and they are secured in the assembly or cluster as shown in Fig. 1 by means of metal retaining members or straps 6 whose form is shown in the end views Figs. 3 and 4. These retaining straps are made each in two parts which are connected at one place by a tightening bolt 7 and at a diametrically opposed place by a locking device which consists of two inter-engaging metallic elements 8 and 9 each of which is hingedly connected to one of the strap components at 10 and 11 respectively.

The locking member 9 carries a pivoted detent 12 adapted to engage a notch 13 formed in the locking member 8 and the two members 8 and 9 are adapted to lie flat on the upper surface of the frame member 2. Each locking member 8 is maintained in engagement with its detent 12 in the position shown in Fig. 3 by means of a locking rod or wire 14 which passes through apertures in the locking member 9 and is connected to an arm 15 pivotally mounted on the frame member 2. The ends of the arm 15 are connected respectively by the rods 14 each to one of the locking devices of which two are employed in the assembly shown in Figs. 1 and 2. One end of the rocking arm 15 is also connected by a rod or wire 16 to an arm 17 mounted on time fuze mechanism adapted to be pre-set and to be ignited by means actuated automatically or by hand as the assembled cluster leaves the aircraft. The connection of the rod 16 to the fuze mechanism normally maintains the arm 15 against movement in a position in which the wires 14 hold the members 8 and 9 in co-operating locking engagement.

The release mechanism shown in Figs. 1 and 2 is shown on an enlarged scale in Fig. 5 and comprises a pull-off device indicated at 30 which is of the kind described in U. S. Patent No. 2,382,-872, granted August 14, 1945. This device is connected to a cylinder 31 containing an explosive cartridge and plunger which carries the arm 17. The pull-off device 30 is supported on the frame member 2 and the cylinder 31 is fixed by means of nuts 38 to the disc 3, which is also provided with apertures through which pass one of the rods 14 and the rod 16. In addition the discs 3 and 3a also support the ends of rods 40 which carry plates 41 at their outer ends which engage between the bombs composing the cluster to serve as spacing and retaining devices to maintain the bombs in their correct relative positions during assembly and until dispersal takes place.

In operation, the pull-off device 30 is actuated as the cluster leaves the aircraft and the time fuze element ignited. After a predetermined time interval, the cartridge within cylinder 31 is exploded to eject the plunger and move the arm 17 from the full line position to the broken line position shown in Fig. 5. This movement also moves the rod 16 to rock the arm 15 in an anticlockwise direction and pull the rods 14 out of engagement with the locking members 8 and 9 which are thereby freed from their interengagement so that the strap members 6 can move apart to the positions shown in Fig. 4 to release the bombs from the cluster to fall thereafter independently.

Another form of mechanism for releasing the locking members 8 and 9 and allowing the assembly of bombs to disperse is shown in Figs. 6 and 7. This consists of a casing 18, constituting a nose-fairing for the assembly, and fixed to the disc 3a and in this casing is mounted a fuze mechanism 19 adapted to be pre-set and which in this form of construction is of the kind illustrated in U. S. Patent No. 2,382,879, granted August 14, 1945. This fuze mechanism is adapted to ignite a length of fuze 20 of the well known type whose length determines the time period which elapses between the ignition thereof and ignition of an explosive charge thereby. This fuze is mounted in a tube 21 communicating with an aperture 22 in a cylinder 23 containing an explosive cartridge 24 and a plunger 25, a rod 26 attached to the plunger being also connected to a plate 27 to which one end of the wire or rod 16 is also connected its other end being connected to an arm 15 mounted in the manner already described. With this arrangement the explosion of the cartridge 24 tends to force the plunger 25 out of the casing 18 through a passage 28 and aperture 29 in the casing 18, the pull thereby exerted on the rod 26 and rod 16 serving to rock the arm 15 to a position in which both rods 14 are disengaged from the members 8 and 9 of the locking devices which can thereby disengage the one from the other to enable the components of the assembly or cluster to disperse as already described.

A modification of the release arrangement shown in Figs. 6 and 7 is shown in Fig. 8 wherein the fuze mechanism 19 acts directly upon an explosive pellet 32 which is disposed in a cylinder 33 arranged in axial alignment with the fuze mechanism. The cylinder contains a small plunger 34 which bears upon one end of a lever 35 movable about a fixed pivot 36 and connected at its other end to the rod 16. To prevent accidental movement, prior to intentional operation, a shear wire 37 passes through the plunger 34 and cylinder 33. Operation of the plunger 34 by explosion of the pellet 32 causes the lever 35 to rock partially in a clockwise direction thereby exerting a sufficient pull on the rod 16 to rock the arm 15 and release the assembly.

The invention enables an assembly of incendiary bombs, for example, to be aimed at a target in the same manner as an explosive bomb from any height, the setting of the delay action release mechanism enabling the assemblage to fall as a whole towards the target but to separate a relatively short distance above ground so that the individual bombs will scatter over the target area.

I claim:

1. In a bomb assembly, the combination of a frame, a strap for embracing and securing an assemblage of bombs to the frame, locking means locking together ends of the strap for holding said strap in bomb securing condition on the frame and including a member for releasing the locking means, explosive means including a member actuated by explosion of said explosive means and having an actuating connection with said releasing member for operating it to release the locking means and thereby unlock the ends of said strap, and a time fuse for igniting the explosive means.

2. Means for releasing the members of an assemblage of bombs, flares or the like after discharge as a cluster from an aircraft, comprising retaining members adjustably connected at adjacent ends and shaped to surround said assemblage, interengaging locking devices cooperating with the other ends of said retaining members, time fuse mechanism, means for initiating the operation of said time fuse mechanism during release of the assemblage from the aircraft, and mechanical transmission means between said fuse mechanism and said locking devices and controlled by said fuse mechanism to release said locking devices and allow the components of the assemblage to disperse after falling a predetermined distance.

3. Releasing means according to claim 2 including a frame member on which said locking devices rest removably, and wherein said mechanical transmission means includes a cylinder mounted on said frame member and connected to said time fuse mechanism, an explosive cartridge in said cylinder, a plunger in said cylinder, a rocking arm connected to said plunger, and a rod extending longitudinally of said frame member and connecting said rocking arm and said locking devices.

4. In a bomb assembly, the combination of a longitudinal frame member, metal straps surrounding said frame member, locking devices for connecting the ends of said straps and resting removably on said frame member for suspending the bomb assembly therefrom, time fuse mechanism, means for initiating operation of said time fuse mechanism during release of the assembly from an aircraft, explosive means operated by said time fuse mechanism, and mechanical means actuated by said explosive means to release said locking devices.

5. An assembly according to claim 4 wherein said explosive means comprises a propellant explosive controlled by said time fuse, a device operative by said explosive means, and a pivoted lever actuated by said explosive operated device, and wherein said mechanical means to release said locking devices is connected to said pivoted lever.

6. Means for supporting a cluster of aerial bombs, flares or the like, comprising a longitudinal frame component, transverse frame components attached to said longitudinal component and having means for seating the ends of the bombs or the like, pivotally connected metal retaining straps for securing the components of the cluster to said frame components, interengaging locking devices carried by said straps, including restraining rods for maintaining said locking devices in locking condition, time fuse mechanism adapted to be ignited as the cluster leaves an aircraft, an explosive device actuated by said fuse mechanism, and mechanical transmission means actuated by said explosive device for operating said restraining rods to release said locking devices and cause dispersal of the cluster components after falling a predetermined distance.

JACK IMBER.

REFERENCES CITED

The following references are of record in the file of this patent:

UNITED STATES PATENTS

| Number | Name | Date |
|---|---|---|
| 1,367,938 | Bettica | Feb. 8, 1921 |
| 1,725,473 | Page | Aug. 20, 1929 |
| 2,323,561 | Newman | July 6, 1943 |
| 2,327,365 | Moseman | Aug. 24, 1943 |
| 2,364,302 | Malone et al. | Dec. 5, 1944 |

FOREIGN PATENTS

| Number | Country | Date |
|---|---|---|
| 264,762 | Italy | May 10, 1929 |